United States Patent [19]
De Regnaucourt

[11] 3,893,688
[45] July 8, 1975

[54] TIRE CARRYING RIM

[75] Inventor: Robert A. De Regnaucourt, Centerville, Ohio

[73] Assignee: Dayton-Walther Corporation, Dayton, Ohio

[22] Filed: July 5, 1974

[21] Appl. No.: 486,020

Related U.S. Application Data

[63] Continuation-in-part of Ser. No. 361,067, May 17, 1973, abandoned.

[52] U.S. Cl............ 301/12 R; 301/11 R; 301/10 R
[51] Int. Cl. ........................................... B60c 5/16
[58] Field of Search ........ 301/10 R, 11 R, 12 R, 95, 301/96, 97, 98, 104

[56] References Cited
UNITED STATES PATENTS
2,884,280  4/1959  Atkin ..................... 301/10 R
3,730,248  5/1973  Beharrell ................. 301/11 R Primary Examiner—M. Henson Wood, Jr.
Assistant Examiner—D. W. Keen
Attorney, Agent, or Firm—Mack D. Cook, II

[57] ABSTRACT

In the original application, Ser. No. 361,067, now abandoned, filed May 17, 1973, a "spoked hub" wheel has a felloe or load bearing portion comprising two intersecting surfaces, an axially oriented rim flange piloting surface and a radially directed rim flange seating surface. In this invention, a tire carrying rim for mounting on the wheel has a flange providing a series of uniformly spaced spoke cap areas. The rim is mounted on the wheel by positioning each of the spoke cap areas over and on a wheel spoke felloe, and is tightened against the rim flange seating surface by a fastening means inserted through the rim flange and into the wheel felloe.

8 Claims, 5 Drawing Figures

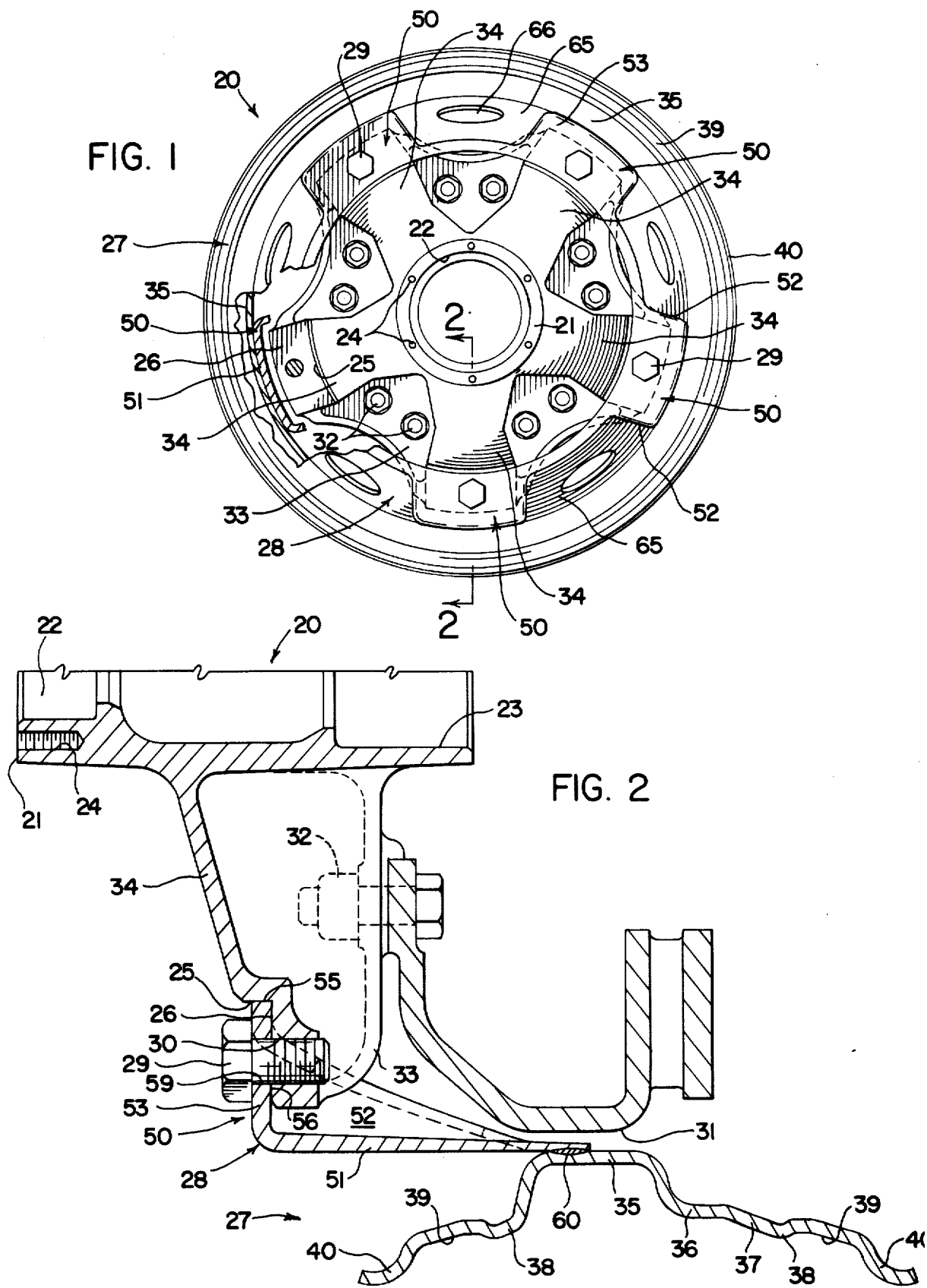

TIRE CARRYING RIM

CROSS-REFERENCE TO RELATED APPLICATIONS

This application is a continuation-in-part of the inventor's application, Ser. No. 361,067, now abandoned, filed May 17, 1973, "VEHICLE WHEEL," and has as its subject matter improvements in tire carrying rims for mounting on the "VEHICLE WHEEL".

BACKGROUND OF THE INVENTION

The invention relates to a tire carrying rim. More particularly, the invention relates to a tire carrying rim having a radially inwardly directed flange for mounting on a vehicle wheel. The subject matter of co-pending application Ser. No. 361,067, now abandoned, filed May 17, 1973, relates to a spoked hub wheel for mounting of a tire carrying rim according to the invention. The search field includes Class 301, sub-class 12R.

The prior art has many forms of tire carrying rims with flanges for mounting on wheel spokes. These prior art assemblies were originally designed for primarily utilitarian purposes. There were no requirements for design standards established by the vehicle manufacturer. However, in recent years the vehicle manufacturer has established standards for both operational characteristics and aesthetic or styling considerations. These standards are now being imposed by the vehicle manufacturer on the suppliers of tire carrying rims and wheels to the extent that the prior art assemblies are no longer acceptable.

The operational characteristics established by the vehicle manufacturer include lighter weight and therefore lower cost, greater strength, increased braking capability, ease in mounting and longer useful life. Also, the resulting assembly should be aesthetically pleasing and stylized in appearance.

The improvement provided by the present invention provides a rim, either "drop center" or "flat base", which may be mounted on a relatively light weight and therefore lower cost spoked wheel. The rim has spoke cap portions providing increased strength and ease in mounting. The spoke cap portions also provide sufficient radial clearance so that a brake drum of relatively large diameter may be carried on a wheel of relatively small diameter. The resultant assembly has a long useful life and will have aesthetic and stylized values.

SUMMARY OF THE INVENTION

The object of the invention is to provide an improved tire carrying rim for mounting on a wheel.

It is a further object of the invention to provide a tire carrying rim for use with a wheel according to co-pending application Ser. No. 361,067, now abandoned.

Still further, it is an object of the invention to provide a tire carrying rim of lighter weight and therefore lower cost, greater strength, increased braking capability, ease in mounting and longer useful life.

Still further, it is an object of the invention to provide a tire carrying rim having aesthetic and stylized values.

These and other objects of the invention and the advantages thereof, will be apparent in view of the Detailed Description of the Invention, as set forth below.

In general, a tire carrying rim according to the invention has a radially inwardly directed flange for mounting on a wheel. A wheel has a hub with a series of spokes, the outer end of each spoke having a felloe comprising two intersecting surfaces: an axially oriented rim flange piloting surface and a radially directed rim flange seating surface. The spoke felloe seating surface has a first bore for receiving a fastening means inserted through the flange. The flange is secured to and mounted beneath a conforming annular surface on the rim and provides a series of spoke cap areas uniformly spaced with each having a second bore for receiving the fastening means to be inserted in the first bore.

Each flange spoke cap area according to the invention has an axially extending web portion, dual axially directed side portions and a radially directed face portion. The web portion, side portions and face portion are interconnected to provide a unitary spoke cap area. Each second bore is formed in a face portion.

The tire carrying rim according to the invention is mounted by positioning each of the spoke cap areas over and on a wheel spoke felloe, with each spoke cap area face portion on a spoke felloe piloting surface and secured against a spoke felloe seating surface by tightening of the fastening means.

DESCRIPTION OF THE DRAWINGS

FIG. 1 is a plan view of a preferred embodiment of a tire carrying rim according to the invention mounted on a wheel;

FIG. 2 is an enlarged sectional view, taken substantially as indicated on line 2—2 of FIG. 1;

DETAILED DESCRIPTION OF THE INVENTION

Figure 3:
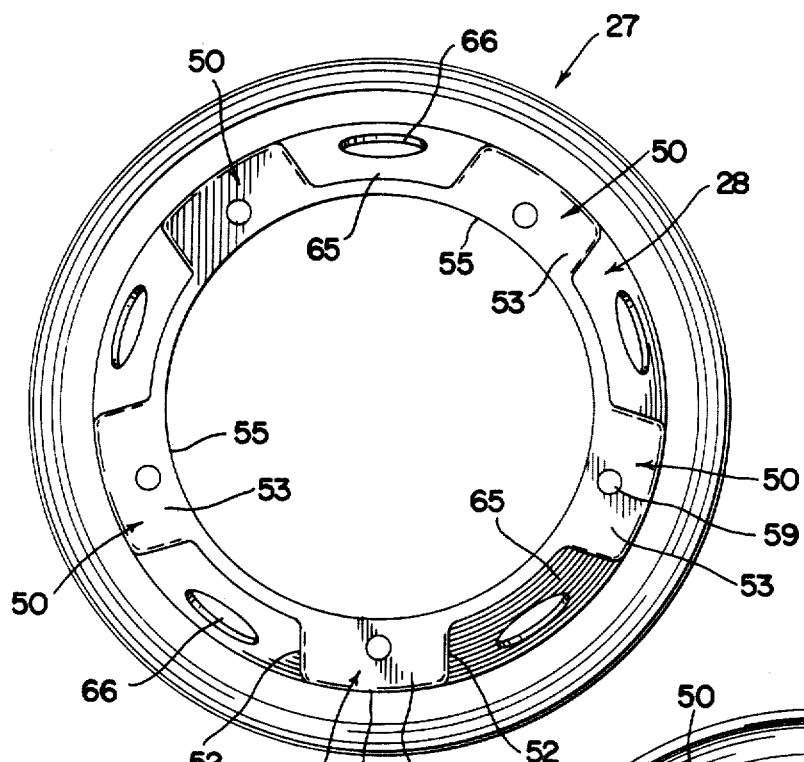
FIG. 3 is a detached plan view of a preferred embodiment of a tire carrying rim according to the invention.

As used herein, a wheel is referred to generally by the numeral 20. A wheel has a conventional hub area 21. The hub area 21 is provided with finished seats 22 and 23 dimensioned as required to receive suitable anti-friction bearings. When the axle and bearings are in place, the hub area is closed with a cover plate (not shown) bolted into tapped holes 24.

The wheel 20 has felloe or load bearing portions, each comprising two intersecting surfaces, an axially oriented rim flange piloting surface referred to generally by the numeral 25 and a radially directed rim flange seating surface referred to generally by the numeral 26.

A tire carrying rim according to the invention, is referred to generally by the numeral 27. Each rim 27 has a radially directed or inwardly projecting mounting flange referred to generally by the numeral 28.

A rim 27 is mounted on the wheel 20 by fastening means 29 inserted through the mounting flange 28 into a series of bores 30 in the felloe surfaces 26.

The brake drum is referred to by the numeral 31. A drum 31 may be for either a disc-type brake (see FIG. 2) or a shoe-type brake (not shown). Access to the brake drum fastening means 32 is provided through hatches or openings 33 between spokes 34 extending radially from the hub area 21.

The location of the drum fastening means 32 permits change of a rim 27 without disturbing the alignment of the drums 31. The hatches or access openings 33 and the spokes 34 contribute to a lighter construction for a wheel 20.

Referring specifically to FIG. 1, a wheel 20 may have a series of, preferably five, spokes 34 each of which terminates in a felloe or load bearing portion comprising the rim flange piloting surface 25 and the intersecting rim flange seating surface 26.

Figure 4:
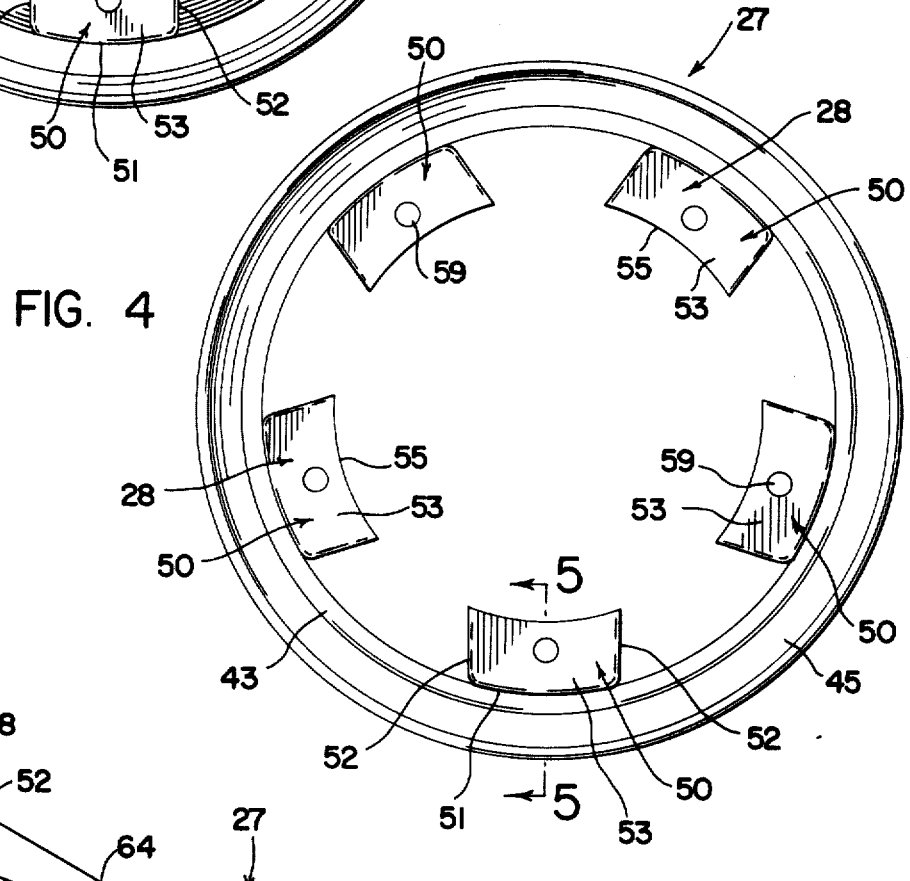
FIG. 4 is a detached plan view of another embodiment of a tire carrying rim according to the invention.
Figure 5:
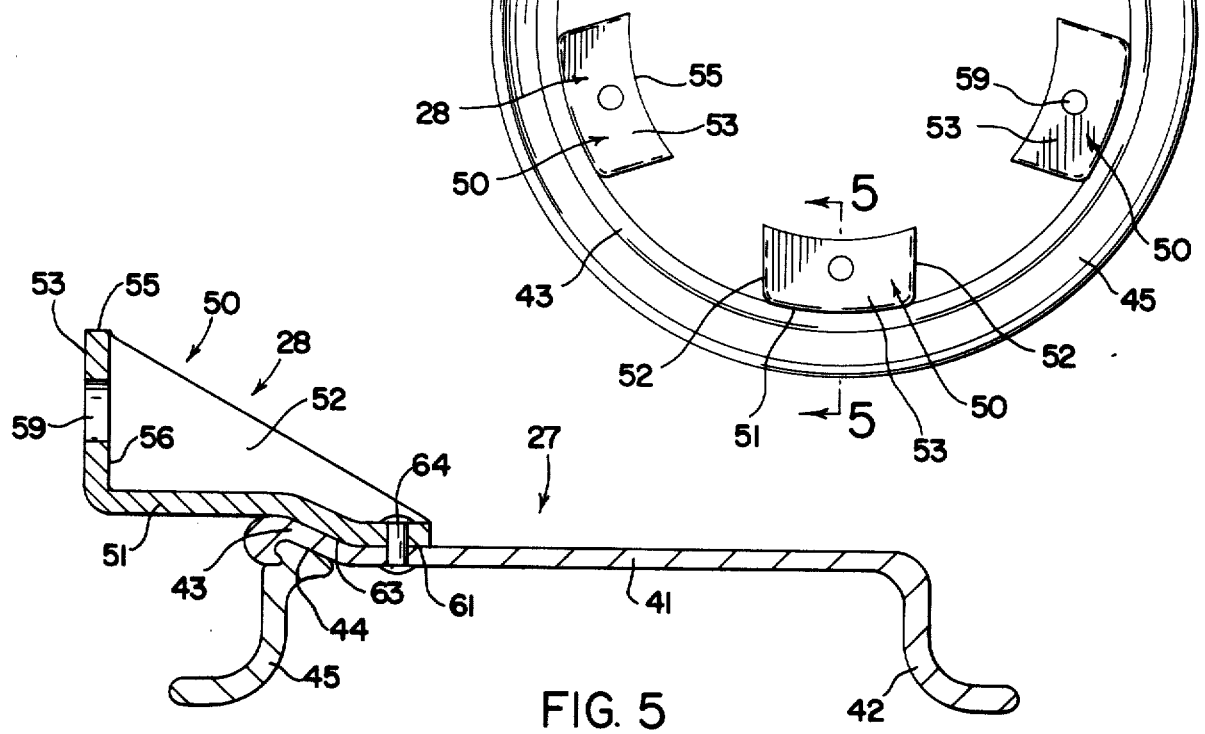
FIG. 5 is an enlarged sectional view, taken substantially as indicated on line 4—4 of FIG. 4.

A rim 27 has a conventional annular peripheral configuration for mounting and carrying a tire thereon. As shown in FIGS. 1-3, the rim 27 is of the so-called "drop center" type. As shown in FIGS. 4 and 5, the rim 27 is of the so-called "flat base" type.

Referring specifically to FIG. 2, a rim 27 may be of assymmetric configuration having an off-center radially inwardly directed well portion 35. An axially oriented ledge portion 36 extends laterally of the well portion 35 on the broader side. The ledge portion 36 intersects a radially outwardly inclined portion 37 which terminates in a bead seat shoulder 38. On the narrower side, the well portion 35 terminates in a bead seat shoulder 38. On both sides, radially outwardly inclined bead seats 39 extend laterally of the bead seat shoulders 38 and terminate in radially outwardly directed fixed bead flanges 40.

Referring specifically to FIG. 5, a rim 27 may have a rim base portion 41 terminating at the axially inner side in a fixed bead flange 42. The axially outer side of the base portion 41 terminates in a radially inwardly inclined flange 43 having a cove area 44 for seating of a removable bead flange 45.

A rim flange 28 according to the invention is secured to and mounted beneath or radially inwardly of a conforming annular surface on the rim 27. A rim flange 28 provides a series of spoke cap areas, indicated generally by the numeral 50, for positioning over and on the felloe of each wheel spoke 34.

A flange spoke cap area 50 according to the invention has an axially extending web portion 51, dual axially directed side portions 52, and a radially directed face portion 53. The web portion 51, dual side portions 52 and face portion 53 are interconnected to provide a unitary spoke cap area 50.

Each spoke cap face portion 53 has a radially inward axially directed surface 55 conforming to the wheel felloe surface 25, a radially directed surface 56 for seating against the wheel felloe surface 26, and a second bore 59 for receiving a fastening means 29 inserted into a wheel bore 30.

Referring to FIG. 2, the axially inner end of a spoke cap web portion 51 may be secured to the radially inner face of well portion 35 of a drop center rim 27 as by a resistance weld 60. Or, referring to FIG. 5, a spoke cap web portion 51 may have an axially inner surface 61, and an intermediate radially inclined surface 63, conforming to the rim base portion 41 and flange 43 of a flat base rim 27, and be secured thereto as by a rivet 64.

The spoke cap areas 50 of a rim flange 28 according to the invention may be interconnected or may be discrete.

FIGS. 1-3 illustrate a preferred embodiment of a tire carrying rim 27 with a radially inwardly directed flange 28 having a series of spoke cap areas 50 interconnected by dish-shaped sections 65 therebetween, to form an annular or circumferentially continuous flange element 28. The dish-shaped sections 65 may have apertures 66 therethrough to allow for the dissipation of heat buildup during vehicle operation and also provide aesthetic and stylized values.

FIGS. 4 and 5 illustrate another embodiment of a tire carrying rim according to the invention with a series of discrete spoke cap areas 50.

The mounting of a rim 27 on a wheel 20 is best understood with reference to FIG. 2. Each spoke cap area 50 is positioned over and on the felloe of a spoke 34, with the surfaces 55 of each face portion 53 on a wheel felloe surface 25. Thereafter, the fastening means 29 are inserted through the second bore 59 in each face portion 53 and into the first bore 30 in each wheel felloe surface 26. The fastening means 29 are then rotated, drawing the rim 27 inwardly along the felloe surfaces 25 until the radial surfaces 56 of each face portion 53 are seated against the felloe surfaces 26, mounting the tire carrying rim 27 on a wheel 20.

What is claimed is:

1. A tire carrying rim having a radially inwardly directed flange for mounting on a wheel,
    a wheel having a hub with a series of spokes, the
    outer end of each wheel spoke having a felloe comprising two intersecting surfaces, an axially oriented rim flange piloting surface and a radially directed rim flange seating surface, said seating surface having a first bore for receiving a fastening means inserted through said flange,
    a flange being secured to and mounted beneath a conforming annular surface on said rim and providing a series of spoke cap areas uniformly spaced with each having a second bore for receiving the fastening means to be inserted in the first bore,
    each flange spoke cap area having an axially extending web portion, dual axially directed side portions and a radially directed face portion, said web portion, side portions and face portion being interconnected to provide a unitary spoke cap area, each second bore being formed in a face portion,
    said tire carrying rim being mounted by positioning each of said spoke cap areas over and on a spoke felloe, with each spoke cap area face portion on a spoke felloe piloting surface and against a spoke felloe seating surface.

2. A tire carrying rim according to claim 1 wherein the annular peripheral configuration thereof is "drop center" having a radially inwardly directed well portion and the axially inner end of a spoke cap web portion is secured to the radially inner face of said well portion.

3. A tire carrying rim according to claim 2 wherein the axially inner end of a spoke cap web portion is secured to the radially inner face of said well portion by a resistance weld.

4. A tire carrying rim according to claim 1 wherein the annular peripheral configuration thereof is "flat base" having a rim base portion with an axially outer side terminating in a radially inwardly inclined flange and a spoke cap web portion has an axially inner surface and an intermediate surface conforming to said rim base portion and flange and secured thereto.

5. A tire carrying rim according to claim 4 wherein the spoke cap well portion is secured to the rim base portion by a rivet.

6. A tire carrying rim according to claim 1 wherein a flange is an annular element with said spoke cap areas being interconnected by sections therebetween.

7. A tire carrying rim according to claim 6 wherein said sections interconnecting said spoke cap areas are dish shaped.

8. A tire carrying rim according to claim 7 wherein said dish-shaped sections have apertures therethrough.

* * * * *